(12) United States Patent
Aoki et al.

(10) Patent No.: US 7,529,447 B2
(45) Date of Patent: May 5, 2009

(54) OPTICAL WAVEGUIDE DEVICES

(75) Inventors: Kenji Aoki, Nagoya (JP); Osamu Mitomi, Nagoya (JP); Jungo Kondo, Aichi-prefecture (JP); Yuichi Iwata, Nagoya (JP); Tetsuya Ejiri, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/121,063

(22) Filed: May 15, 2008

(65) Prior Publication Data

US 2008/0226215 A1    Sep. 18, 2008

Related U.S. Application Data

(63) Continuation of application No. PCT/JP2006/323253, filed on Nov. 15, 2006.

(30) Foreign Application Priority Data

Nov. 16, 2005  (JP)  ............... 2005-331698
May 25, 2006  (JP)  ............... 2006-145163

(51) Int. Cl.
    *G02B 6/26*        (2006.01)
(52) U.S. Cl. ................. 385/40; 385/45; 385/2
(58) Field of Classification Search ............ 385/40, 385/2, 45
    See application file for complete search history.

(56) References Cited

U.S. PATENT DOCUMENTS 6,243,516 B1 *   6/2001   Seino ........................ 385/47

6,862,387 B2 *   3/2005   Howerton et al. ............. 385/47
7,054,512 B2     5/2006   Sugiyama et al.

(Continued)

FOREIGN PATENT DOCUMENTS

JP          04-355714 A1    12/1992

(Continued)

OTHER PUBLICATIONS

Masaki Sugiyama et al., "*Compact Zero-Chirp LiNbO₃ Modulator for 10-Gb/s Small-Form-Factor Transponder*," ECOC 2004 Proceedings, Paper Th4.2.3, pp. 20-21.

*Primary Examiner*—Ellen Kim
(74) *Attorney, Agent, or Firm*—Burr & Brown

(57) ABSTRACT

The present invention provides an optical waveguide device having a configuration such that the optical waveguide is folded back on an end area of the optical waveguide substrate to widen the modulation band. The optical waveguide device 1A includes a substrate body 2 made of an electro-optical material, optical waveguide 6, and modulation electrodes 3, 4 and 5 for applying a voltage on the optical waveguide 6. The optical waveguide 6 includes first primary areas 6e and 6f, a first curved area 7A, first folding-back areas 6g and 6h provided between the first curved area 7A and a folding-back point 8, second primary areas 6m and 6n, a second curved area 7B, and second folding-back areas 6j and 6k provided between the second curved area 7B and the folding-back point 8. At least a part of the signal electrode is provided in a folding-back region extending from the first curved area 7A and the second curved area 7B to the folding-back point 8.

9 Claims, 12 Drawing Sheets

U.S. PATENT DOCUMENTS

| | | | |
|---|---|---|---|
| 7,155,072 B2 * | 12/2006 | Sugiyama et al. | 385/2 |
| 7,177,490 B2 | 2/2007 | Sugiyama et al. | |
| 7,212,326 B2 * | 5/2007 | Wooten et al. | 359/245 |
| 7,382,942 B2 * | 6/2008 | Mitomi et al. | 385/2 |

FOREIGN PATENT DOCUMENTS

| | | |
|---|---|---|
| JP | 05-232417 A1 | 9/1993 |
| JP | 05-297332 A1 | 11/1993 |
| JP | 2004-287093 A1 | 1/2004 |

* cited by examiner

OPTICAL WAVEGUIDE DEVICES

TECHNICAL FIELD OF THE INVENTION

The present invention relates to an optical waveguide device such as a traveling-wave optical modulator.

BACKGROUND ART

Japanese Patent Publication No. H04-355714A discloses a technique that elongates the interaction length of a light wave and a modulated wave by folding back the optical waveguide of an optical control element at the end face of a substrate, lowers the drive voltage, and compensates the difference of matching speed between the light wave and a signal wave to realize a high-speed operation.

Trials have been made in, for example, "ECOC 2004 PD Th4.2.3" "Compact Zero-Chirp LiNbO3 Modulator for 10-Gb/s Small-Form-Factor Transponder", which achieve a long interaction length even when a substrate length is shrunk by curving and bending an optical waveguide in a loop form inside an optical modulator.

DISCLOSURE OF THE INVENTION

In the optical control element disclosed in the Japanese Patent Publication No. H04-355714A, since it is difficult to sharply bend the optical waveguide from the viewpoint of the property of its own, the optical waveguide length in the folding-back area becomes considerably long in comparison to the electrode length. Accordingly, the modulation band is restricted by the arrival time difference between the light wave and the electric signal wave.

In the optical modulator disclosed in "ECOC 2004 PD Th4.2.3" and "Compact Zero-Chirp LiNbO3 Modulator for 10-Gb/s Small-Form-Factor Transponder", it is necessary to execute a domain inversion process in addition to the normal process in order to achieve the zero-chirp characteristic, which is complicated and leads to a cost increase. Further, since the optical modulator uses a Z-plate, there are disadvantages that the stability of operation (DC drift, temperature drift) is not good.

An object of the present invention is to widen the modulation band, in an optical waveguide device whose optical waveguide is folded back at the end area of the optical waveguide substrate.

The present invention provides an optical waveguide device comprising:

a substrate body comprising an electro-optical material;

an optical waveguide; and a signal electrode and a grounding electrode for applying a voltage on the optical waveguide. The optical waveguide has a first primary area, a first curved area, a first folding-back area provided between the first curved area and a folding-back point, a second primary area, a second curved area, and a second folding-back area provided between the second curved area and the folding-back point. At least a part of the signal electrode is provided in a folding-back region extending from the first curved area and the second curved area toward the folding-back point.

According to the present invention, the difference between an optical path length inside the optical waveguide and a modulation electrode length can be remarkably reduced by providing at least a part of the signal electrode in the folding-back region extending from the first curved area and the second curved area toward the folding-back point. Accordingly, it becomes possible to remarkably widen the modulation band. Conventionally, such a trial has not been made that the signal electrode is provided in the folding-back region ahead of the curved areas of the optical waveguide.

BEST MODES FOR CARRYING OUT THE INVENTION

A preferred embodiment of the optical waveguide device is configured in a manner that the voltages are applied to the optical waveguide through the signal electrode and the grounding electrode, in the first folding-back area and the second folding-back area in addition to the first primary area and the second primary area. In the conventional technique, the area before the curved point in the optical waveguide is called the "interaction area", and skilled artisans would have not have an idea of putting the electrodes and the optical waveguide into interaction in the folding-back region on the end side of the substrate from the curved area. As a result, it is possible to increase the length of an area to which the modulation voltage is applied in the optical waveguide, and at the same time to remarkably reduce the difference between the optical path length inside the optical waveguide and the modulation electrode length. Accordingly, it has become possible to lower the drive voltage and at the same time to remarkably widen the modulation band.

And in another preferred embodiment, a first expanded part is inclined to the first folding-back area of the optical waveguide, so as to expand toward an outer edge of the substrate body. Also in this embodiment, a second expanded part is inclined to the second folding-back area of the optical waveguide, so as to expand toward the outer edge of the substrate body.

Thus, it is possible to elongate the signal electrode and remarkably reduce the difference between the optical path length inside the optical waveguide and a signal electrode length. Accordingly, it has become possible to lower the drive voltage and at the same time to remarkably widen the modulation band.

The present invention will be described in detail, with reference to the appended drawings.

Figure 1:
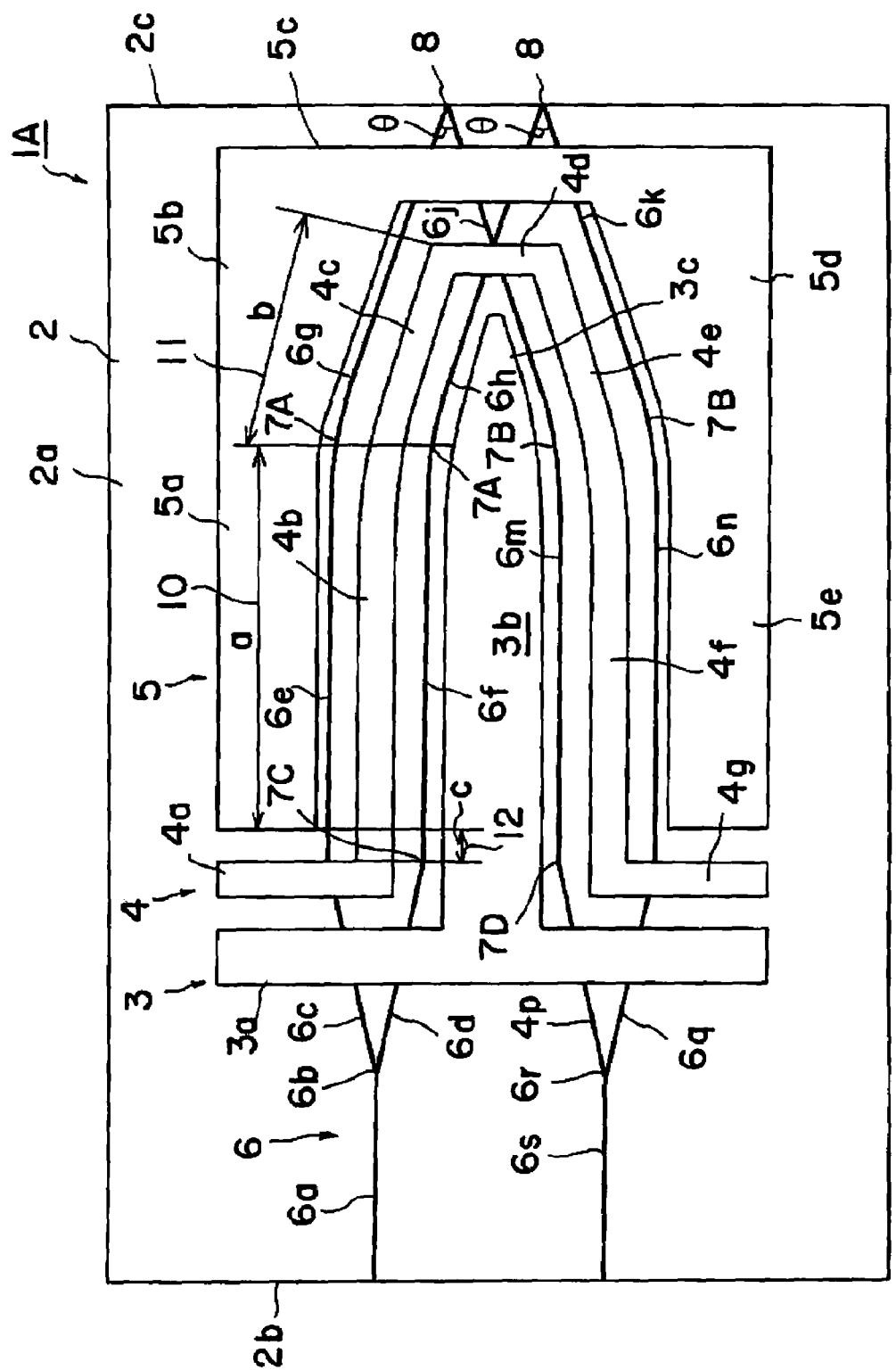
FIG. 1 is a plan view schematically illustrating an optical waveguide device 1A according to one embodiment of the present invention.
Figure 2:
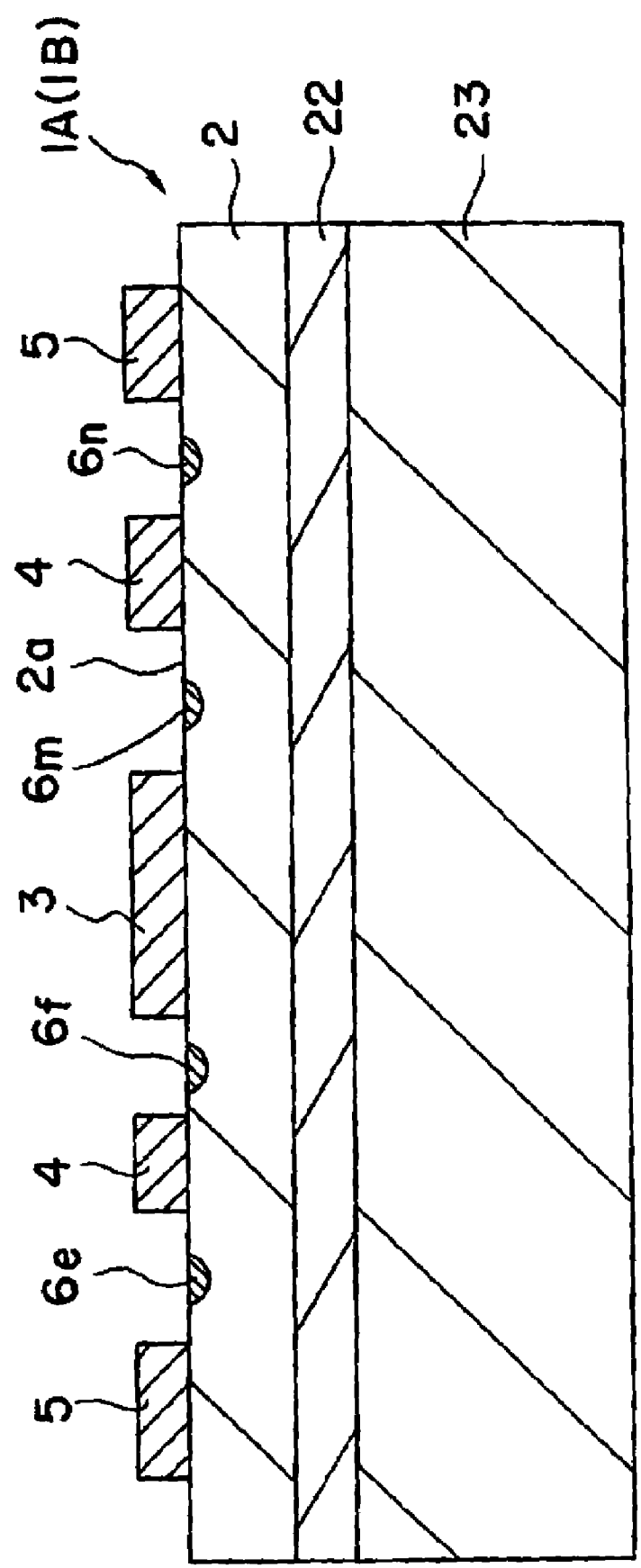
FIG. 2 is a sectional view schematically illustrating the optical waveguide device 1A.
Figure 3:
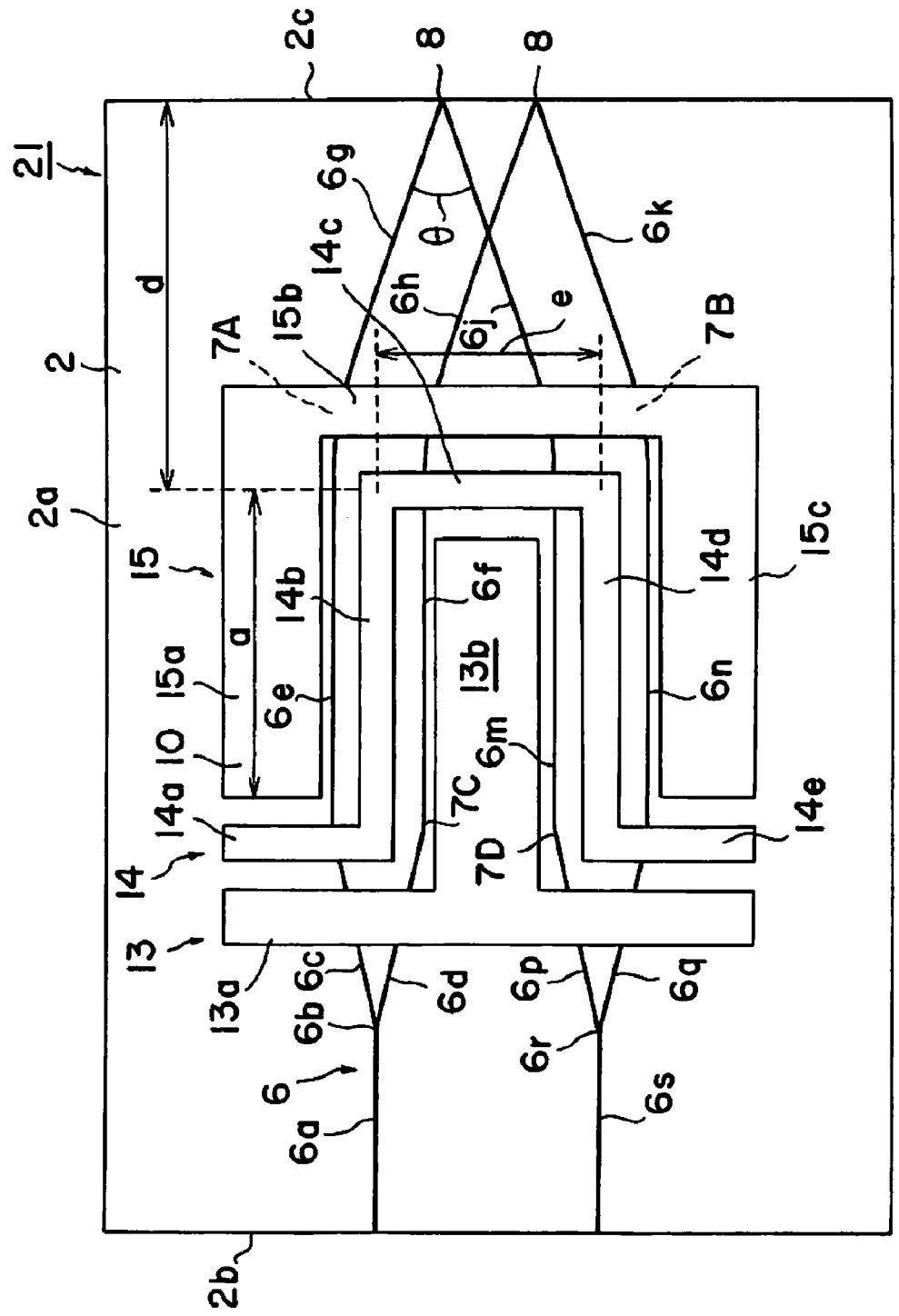
FIG. 3 is a plan view schematically illustrating an optical waveguide device 21 as a comparison example out of the invention.

FIG. 1 is a plan view schematically illustrating an optical waveguide device 1A according to one embodiment of the present invention, and FIG. 2 is a cross-sectional view of the optical waveguide device 1A in FIG. 1. FIG. 3 is a plan view schematically illustrating an optical waveguide device 21 for comparison.

The optical waveguide device 1A in FIG. 1 includes a substrate body 2. As shown in FIG. 2, the substrate body 2 may be adhered on a supporting substrate 23 through an adhesive layer 22. The substrate body 2 in this embodiment is formed in a flat plate, but it is not limited to the flat plate. On one primary plane 2a of the substrate body 2 are formed predetermined grounding electrodes 3 and 5 and a predetermined signal electrode 4. This embodiment adopts an electrode arrangement of the so-called coplanar waveguide electrode (CPW electrode), but the electrode arrangement is not particularly limited to this. In this embodiment, optical waveguides are formed in gaps between the signal electrode and the grounding electrodes adjacent to each other, and a signal voltage is applied in a substantially horizontal direction to each of the optical waveguides.

A beam of light that enters through an end area 6a of the optical waveguide 6 is branched at a branch point 6b, and the beams pass through incident areas 6c and 6d to enter first primary areas 6e and 6f, respectively through third curved areas 7C. The primary areas 6e and 6f, which are conventionally called the "interaction area", are made of two mutually parallel optical waveguides 6e and 6f. The beams of light transmitting through the primary areas 6e and 6f pass through first curved areas 7A to transmit through folding-back areas 6g and 6h. The folding-back areas 6g and 6h are inclined by a predetermined angle to the primary areas 6e and 6f, respectively The beams of light reflect at folding-back points 8, and the beams transmit through second folding-back areas 6j and 6k, respectively and thereafter pass through second curved areas 7B to transmit through second primary areas 6m and 6n, respectively And the beams transmitting through fourth curved areas 7D and outgoing areas 6p and 6q are multiplexed at a multiplexing point 6r to enter an outgoing area 6s.

The numerals 3 and 5 denote the grounding electrodes, and the numeral 4 denotes the signal electrode. In this embodiment, the voltages are applied to the optical waveguide 6 in each of the gaps between the grounding electrodes 3 and 5 and the signal electrode 4.

The inner grounding electrode 3 includes a feeding part 3a connected to a feed-through (not shown) and an electrode part 3b formed in a line, which extends substantially parallel to the primary areas. The outer grounding electrode 5 includes a connection part 5c stepping over the optical waveguides, electrode part 5b extending to both sides from the connection part 5c, and electrode parts 5a and 5e extending parallel to the primary parts 6e and 6f from the electrode part 5b. The signal electrode 4 includes a pair of feeding parts 4a and 4g, electrode parts 4b and 4f extending parallel to each of the primary parts 6e and 6f from each of the feeding parts 4a and 4g, electrode parts 4c and 4e extending from each of the electrode parts 4b and 4f, and a connection part 4d that connects the electrode parts 4c and 4e.

As a result, interaction areas 10 and 11 are formed in the first primary areas 6e and 6f, first folding-back areas 6g and 6h, second folding-back areas 6j and 6k and second primary areas 6m and 6n. In each of the interaction areas, a voltage is applied to the light wave transmitting through the optical waveguide. The total length of the interaction areas is "2a+2b". In addition to this, interaction areas 12 lie in the first primary area 6f and the second primary area 6m. The total length thereof is c.

On the other hand, the design pattern of a conventional optical waveguide device 21 is such as one shown in FIG. 3. The beam of light that enters through the end area 6a of the optical waveguide 6 is branched at the branch point 6b, and the beams pass through the incident areas 6c and 6d to enter the first primary areas 6e and 6f, respectively through the third curved areas 7C. The primary areas 6e and 6f are the interaction area. The beams of light transmitting through the primary areas 6e and 6f pass through the first curved areas 7A to transmit through the folding-back areas 6g and 6h. The folding-back areas 6g and 6h are inclined by a predetermined angle to the primary areas 6e and 6f, respectively.

The beams of light reflect at the folding-back points 8, and the beams transmit through the second folding-back areas 6j and 6k, and thereafter pass through the second curved areas 7B to transmit through the second primary areas 6m and 6n. And the beams transmitting through the fourth curved areas 7D and the outgoing areas 6p and 6q are multiplexed at the multiplexing point 6r to enter the outgoing area 6s.

The numerals 13 and 15 denote the grounding electrodes, and the numeral 14 denotes the signal electrode. In this embodiment, the voltages are applied to the optical waveguide 6 in the gaps between the grounding electrodes 13 and 15 and the signal electrode 14, respectively.

The inner grounding electrode 13 includes a feeding part 13a connected to the feed-through (not shown) and an electrode part 13b formed in a line, which extends substantially parallel to the primary areas. The outer grounding electrode 15 includes a connection part 15b stepping over the optical waveguides, and electrode parts 15a and 15c extending to both sides from the connection part 15b in parallel to the primary parts 16e and 16f. The signal electrode 14 includes a pair of feeding parts 14a and 14e, and electrode parts 14b and 14d extending parallel to each of the primary parts 6e and 6f, respectively, from the feeding parts 14a and 14e. The numeral 14c denotes a connection part.

As a result, the interaction areas 10 are formed in the first primary areas 6e and 6f and the second primary areas 6m and 6n. In each of the interaction areas, a voltage is applied to the light wave transmitting through the optical waveguide. The total length of the interaction areas is 2a.

As a result, in the optical waveguide device 21 shown in FIG. 3, the first folding-back areas and the second folding-back areas do not have the interaction area between the electrode and the optical waveguide. Therefore, the optical waveguide length becomes remarkably longer than the length of the signal electrode 14. Concretely since the signal electrode does not lie in the area of the length d, the electrode length becomes remarkably smaller than the optical waveguide length. As a result, since it is difficult to sharply bend the optical waveguide by the property of its own, the optical waveguide length in the folding-back areas becomes considerably longer than the electrode length. Accordingly, the modulation band is restricted by the arrival time difference between the light wave and the electric signal wave.

On the other hand, according to the optical waveguide device 1A shown in FIG. 1, for example, the interaction areas are provided in the first folding-back areas and the second folding-back areas. Therefore, the difference between the optical waveguide length and the signal electrode length becomes remarkably small, and the arrival time difference between the light wave and the electric signal wave becomes remarkably small. Consequently, the modulation band becomes remarkably wide, and it becomes possible to provide such a wideband optical modulator that the conventional technique could not provide, and furthermore the drive voltage is remarkably reduced.

Figure 4:
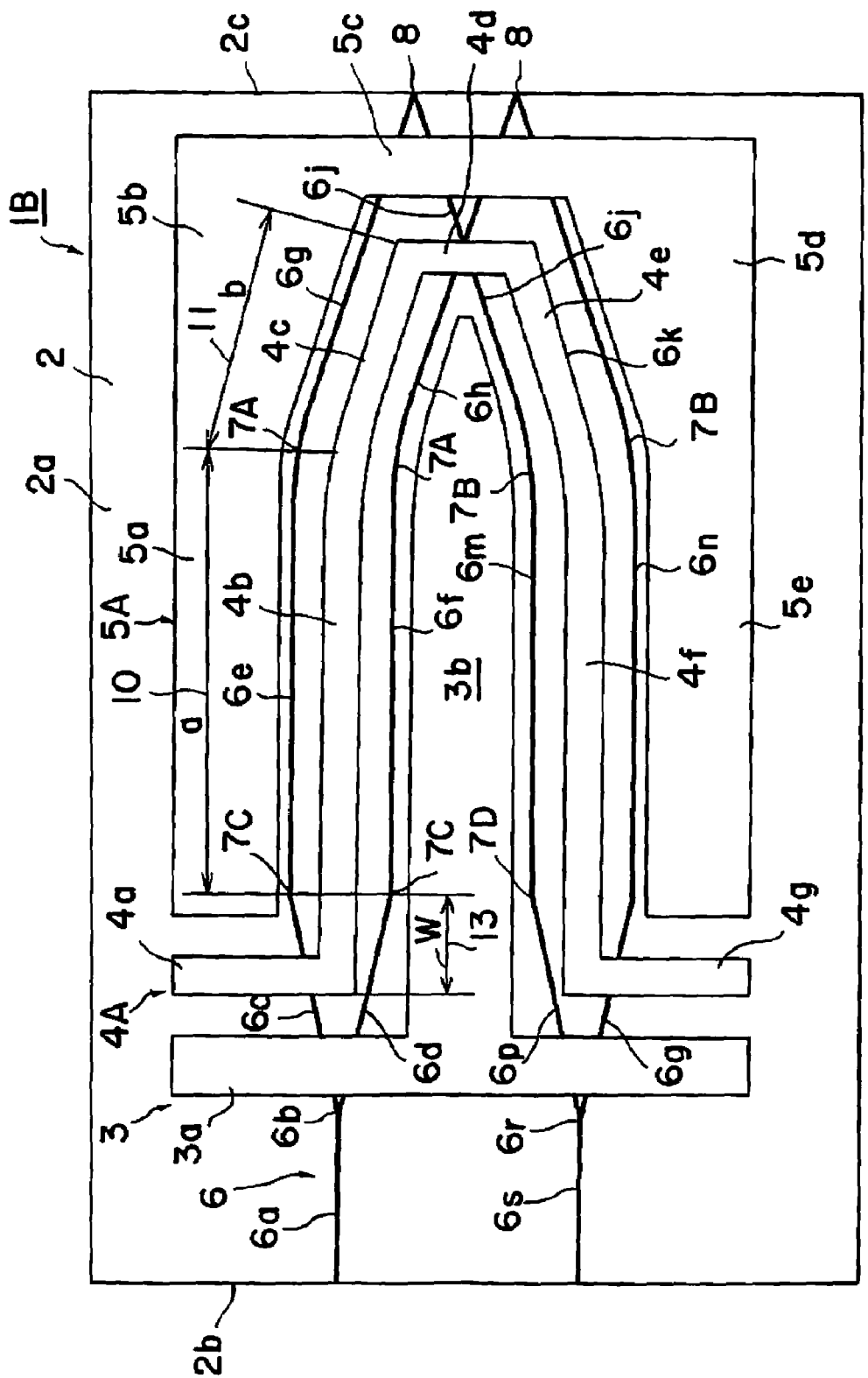
FIG. 4 is a plan view schematically illustrating an optical waveguide device 1B according to another embodiment of the present invention.

The optical waveguide device 1B in FIG. 4 includes the substrate body 2. As shown in FIG. 2, the substrate body 2 may be adhered on the supporting substrate 23 through the adhesive layer 22. The substrate body 2 in this embodiment is formed in a flat plate, but it is not limited to the flat plate. On one primary plane 2a of the substrate body 2 are formed predetermined grounding electrodes 3 and 5A and a predetermined signal electrode 4A. This embodiment adopts the electrode arrangement of the so-called coplanar waveguide electrode (CPW electrode), but the electrode arrangement is not particularly limited to this. In this embodiment, optical waveguides are formed in the gaps between the signal electrode and the grounding electrodes adjacent to each other, and the signal voltage is applied in a substantially horizontal direction to each of the optical waveguides.

The beam of light that enters through the end area 6a of the optical waveguide 6 is branched at the branch point 6b, and the beams pass through the incident areas 6c and 6d to enter the first primary areas 6e and 6f, respectively from the third curved areas 7C. The primary areas 6e and 6f, which are conventionally called the "interaction area", are made of two mutually parallel optical waveguides 6e and 6f. The beams of light transmitting through the primary areas 6e and 6f pass through the first curved areas 7A to transmit through the folding-back areas 6g and 6h. The folding-back areas 6g and 6h are inclined by a predetermined angle to the primary areas 6e and 6f, respectively.

The beams of light reflect at the folding-back points 8, and each transmits through the second folding-back areas 6j and 6k, respectively and thereafter passes through the second curved areas 7B to transmit through the second primary areas 6m and 6n, respectively. And the beams transmitting through the fourth curved areas 7D and the outgoing areas 6p and 6q are multiplexed at the multiplexing point 6r to enter the outgoing area 6s.

The inner grounding electrode 3 includes the feeding part 3a connected to the feed-through (not shown) and the electrode part 3b formed in a line, which extends substantially parallel to the primary areas. The outer grounding electrode 5A includes the connection part 5c stepping over the optical waveguides, the electrode parts 5b and 5d extending to both sides from the connection part 5c, and the electrode parts 5a and 5e extending parallel to the primary parts 6e and 6f from the electrode parts 5b and 5d. The signal electrode 4A includes a pair of the feeding parts 4a and 4g, the electrode parts 4b and 4f extending parallel to each of the primary parts 6e and 6f from each of the feeding parts 4a and 4g, the electrode parts 4c and 4e extending from each of the electrode parts 4b and 4f, and the connection part 4d that connects the electrode parts 4c and 4e.

As a result, the interaction areas 10 and 11 are formed in the first primary areas 6e and 6f, the first folding-back areas 6g and 6h, the second folding-back areas 6j and 6k, and the second primary areas 6m and 6n. In each of the interaction areas, the voltage is applied to the light wave transmitting through the optical waveguide. The total length of the interaction areas is "2a+2b". In addition to this, interaction areas 13 lie in the incident area 6d and the outgoing area 6p in this embodiment. In this embodiment, the length w of the interaction areas 13 is significant, and they are considerably close to the branch point 6b and the multiplexing point 6r. Accordingly, being on opposite side to the folding-back points 8, the interaction areas can expand the interaction areas, and it is possible to thereby widen the modulation band and reduce the drive voltage to that extent.

Figure 8:
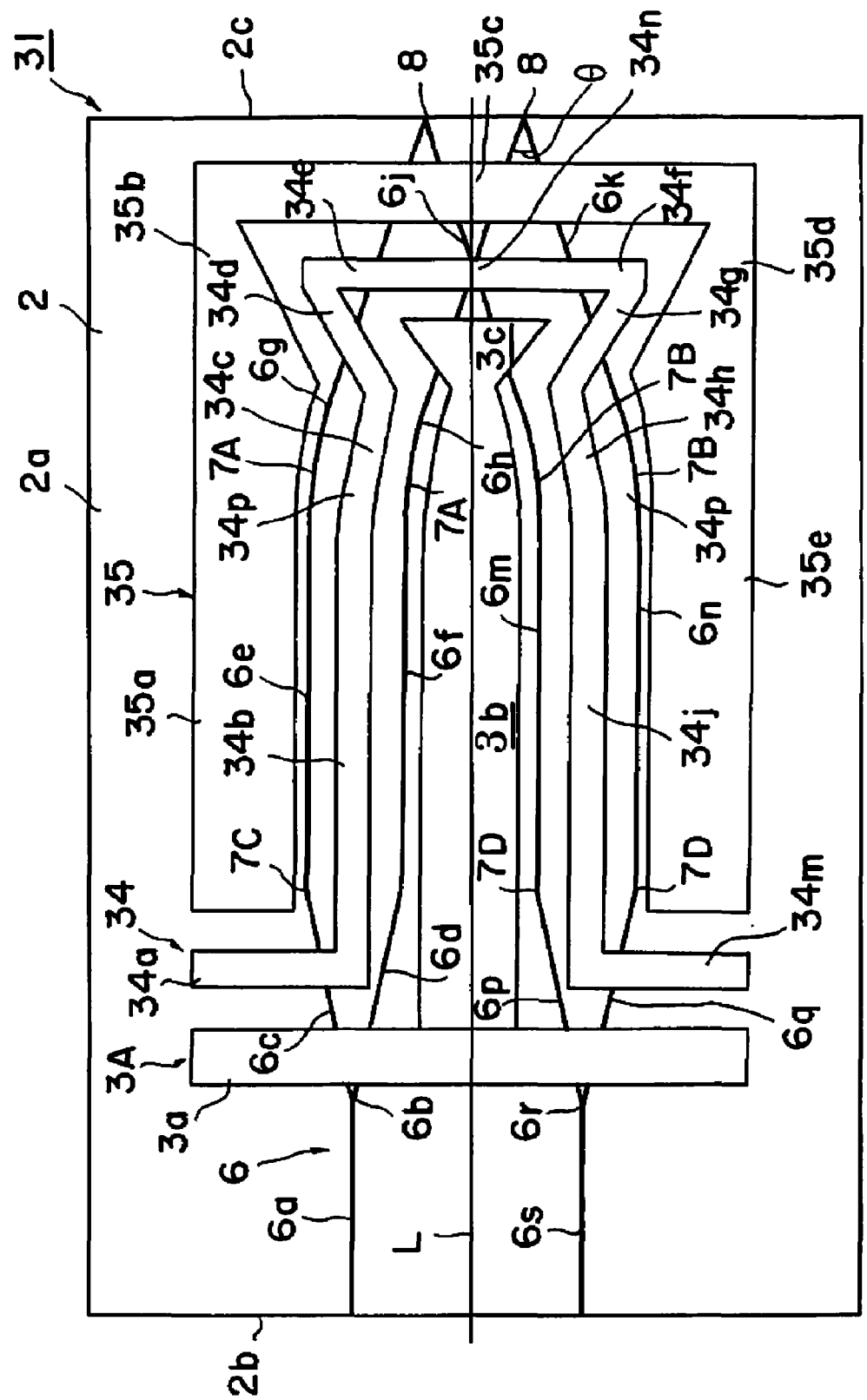
FIG. 8 is a plan view illustrating a device 31 according to the present invention.

FIG. 8 is a plan view illustrating an optical waveguide device 31.

The optical waveguide device 31 in FIG. 8 includes the substrate body 2. As shown in FIG. 2, the substrate body 2 may be adhered on the supporting substrate 23 through the adhesive layer 22. On one primary plane 2a of the substrate body 2 are formed predetermined grounding electrodes 3A and 35 and a predetermined signal electrode 34. This embodiment adopts the electrode arrangement of the so-called coplanar waveguide electrode (CPW electrode), but the electrode arrangement is not particularly limited to this. In this embodiment, optical waveguides are formed in the gaps between the signal electrode and the grounding electrodes adjacent to each other, and the signal voltage is applied in a substantially horizontal direction to each of the optical waveguides.

The beam of light that enters through the end area 6a of the optical waveguide 6 is branched at the branch point 6b, and the beams pass through the incident areas 6c and 6d to enter the first primary areas 6e and 6f, respectively through the third curved areas 7C. The primary areas 6e and 6f, which are conventionally called the "interaction area", are made of two mutually parallel optical waveguides 6e and 6f. The beams of light transmitting through the primary areas 6e and 6f pass through the first curved areas 7A to transmit through the folding-back areas 6g and 6h. The folding-back areas 6g and 6h are inclined by a predetermined angle to the primary areas 6e and 6f, respectively.

The beams of light reflect at the folding-back points 8, and the beams transmit through the second folding-back areas 6j and 6k, and thereafter pass through the second curved areas 7B to transmit through the second primary areas 6m and 6n, respectively. And the beams transmitting through the fourth curved areas 7D and the outgoing areas 6p and 6q are multiplexed at the multiplexing point 6r to enter the outgoing area 6s.

The inner grounding electrode 3A includes the feeding part 3a connected to the feed-through (not shown), the electrode part 3b formed in a line, which extends substantially parallel to the primary parts, and a widened part 3c provided on the end of the electrode part 3b. The outer grounding electrode 35 includes a connection part 35c stepping over the optical waveguides, a pair of electrode parts 35a, and a connection part 35b corresponding to expanded parts.

The signal electrode 34 includes a pair of feeding parts 34a and 34m, main parts 34b and 34j extending parallel to the primary parts 6e and 6f from the feeding parts 34a and 34m, and the expanded parts 34c and 34h curving and bending toward the folding-back points 8 from the main parts. The numerals 34p denote a curving point. The expanded parts 34d and 34g each extend outward (against the central axis L of the optical waveguide 6) from the main parts 34b and 34j. The expanded parts 34d and 34g connect to the expanded parts 34e and 34f, respectively that extend substantially parallel to the connection part 35c of the grounding electrode. The expanded parts 34e and 34f are mutually connected by a connection part 34n.

In the device shown in FIG. 8, the voltage can be applied to the primary areas 6e, 6f, 6m and 6n of the optical waveguide 6 through the signal electrodes 34b and 34j. In addition to this, the voltage can be applied to parts of the folding-back areas 6g, 6h, 6j and 6k of the optical waveguide 6 through the curved areas 34c and 34h of the signal electrodes. Since the interaction areas are provided in the first and second folding-back areas, the difference between the optical waveguide length and the signal electrode length becomes remarkably small, and also the arrival time difference between the light wave and the electric signal wave becomes remarkably small. Consequently, the modulation band becomes remarkably wide, and it becomes possible to provide such a wideband optical modulator that the conventional technique could not provide, and furthermore the drive voltage is remarkably reduced.

Moreover, in this embodiment, the expanded parts 34c, 34d, 34e, 34f, 34g and 34h are provided in the signal electrode 34. Accordingly, the signal electrode length can be made longer, and the difference between the optical path length inside the optical waveguide and the signal electrode length can be remarkably reduced. Consequently, it has become possible to lower the drive voltage and at the same time to remarkably widen the modulation band.

Figure 9:
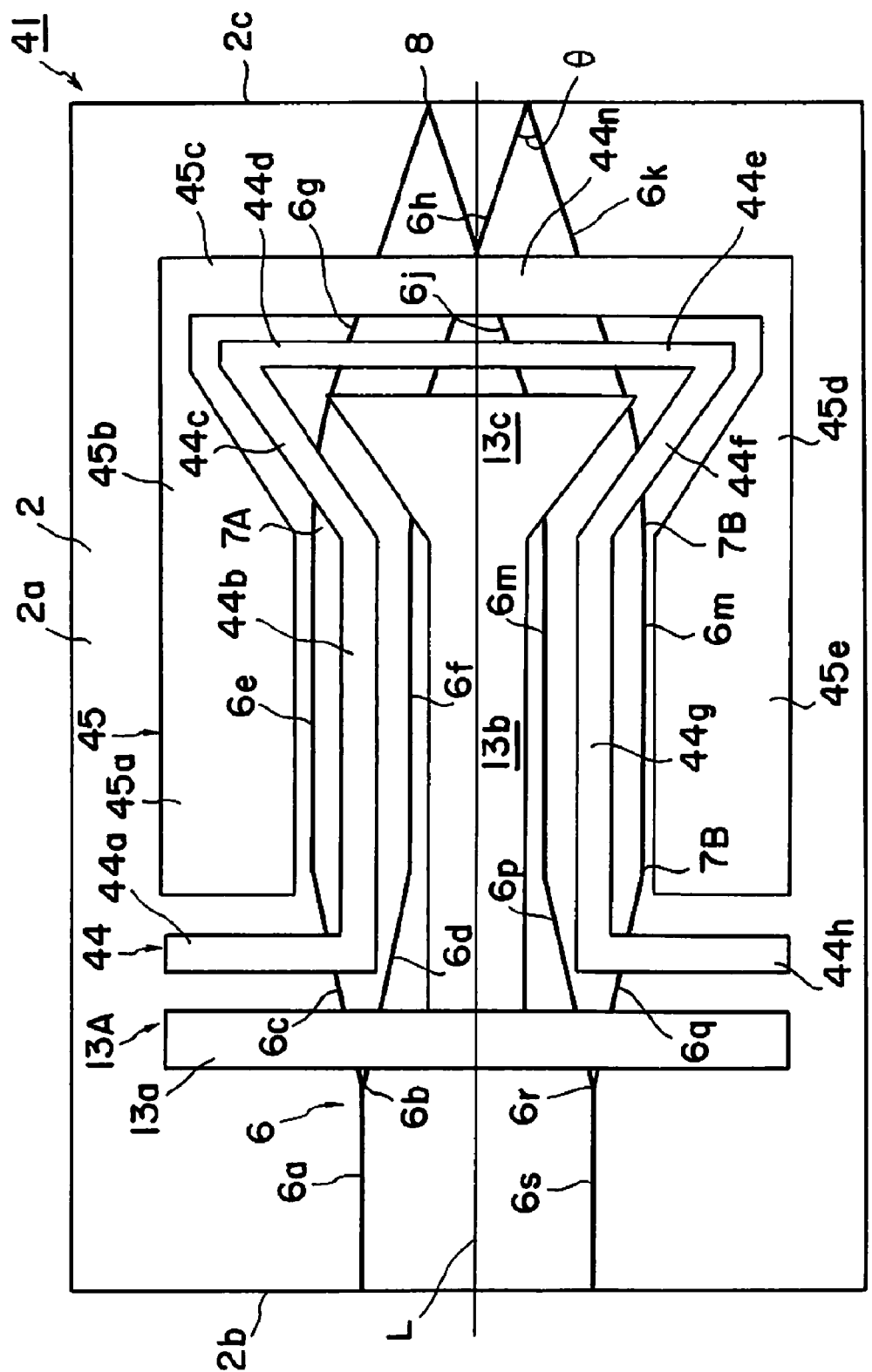
FIG. 9 is a plan view illustrating a device 41 according to the present invention.

The optical waveguide device 41 in FIG. 9 includes the substrate body 2. As shown in FIG. 2, the substrate body 2 may be adhered on the supporting substrate 23 through the adhesive layer 22. On one primary plane 2a of the substrate body 2 are formed predetermined grounding electrodes 13A and 45 and a predetermined signal electrode 44.

The beam of light that enters through the end area 6a of the optical waveguide 6 is branched at the branch point 6b, the beams pass through the incident areas 6c and 6d to enter the first primary areas 6e and 6f, respectively, through the third curved areas 7C. Then, the beams of light transmitting through the primary areas 6e and 6f pass through the first curved areas 7A to transmit through the folding-back areas 6g and 6h, respectively. The folding-back areas 6g and 6h are inclined by a predetermined angle to the primary areas 6e and 6f, respectively.

The beams of light reflect at the folding-back points 8, and the beams transmit through the second folding-back areas 6j and 6k, respectively and thereafter pass through the second curved areas 7B to transmit through the second primary areas 6m and 6n, respectively. And the beams transmitting through the fourth curved areas 7D and the outgoing areas 6p and 6q are multiplexed at the multiplexing point 6r to enter the outgoing area 6s.

The inner grounding electrode 13A includes the feeding part 13a connected to the feed-through (not shown), the electrode part 13b formed in a line, which extends substantially parallel to the primary parts, and a widened part 13c provided on the end of the electrode part 13b. The outer grounding electrode 45 includes a connection part 45c stepping over the optical waveguides, a pair of electrode parts 45a and 45e, and connection parts 45b and 45d corresponding to the expanded parts, respectively.

The signal electrode 44 includes a pair of feeding parts 44a and 44h, and main parts 44b and 44g extending parallel to the primary areas 6e and 6f from each of the feeding parts 44a and 44h. And the expanded parts 44c and 44f extend outward (against the central axis L of the optical waveguide 6) from the main parts 44b and 44g, and the expanded parts 44c and 44f each connect to the expanded parts 44d and 44e that extend substantially parallel to the connection part 45c of the grounding electrode 45. The expanded parts 44d and 44e are mutually connected by a connection part 44n.

In the device shown in FIG. 9, the signal electrode 44 is provided with the expanded parts 44c, 44d, 44e and 44f. Accordingly, it becomes possible to increase the signal electrode length and to remarkably reduce the difference between the optical path length inside the optical waveguide and the signal electrode length. Consequently, it has become possible to lower the drive voltage and at the same time to remarkably widen the modulation band.

Figure 10:
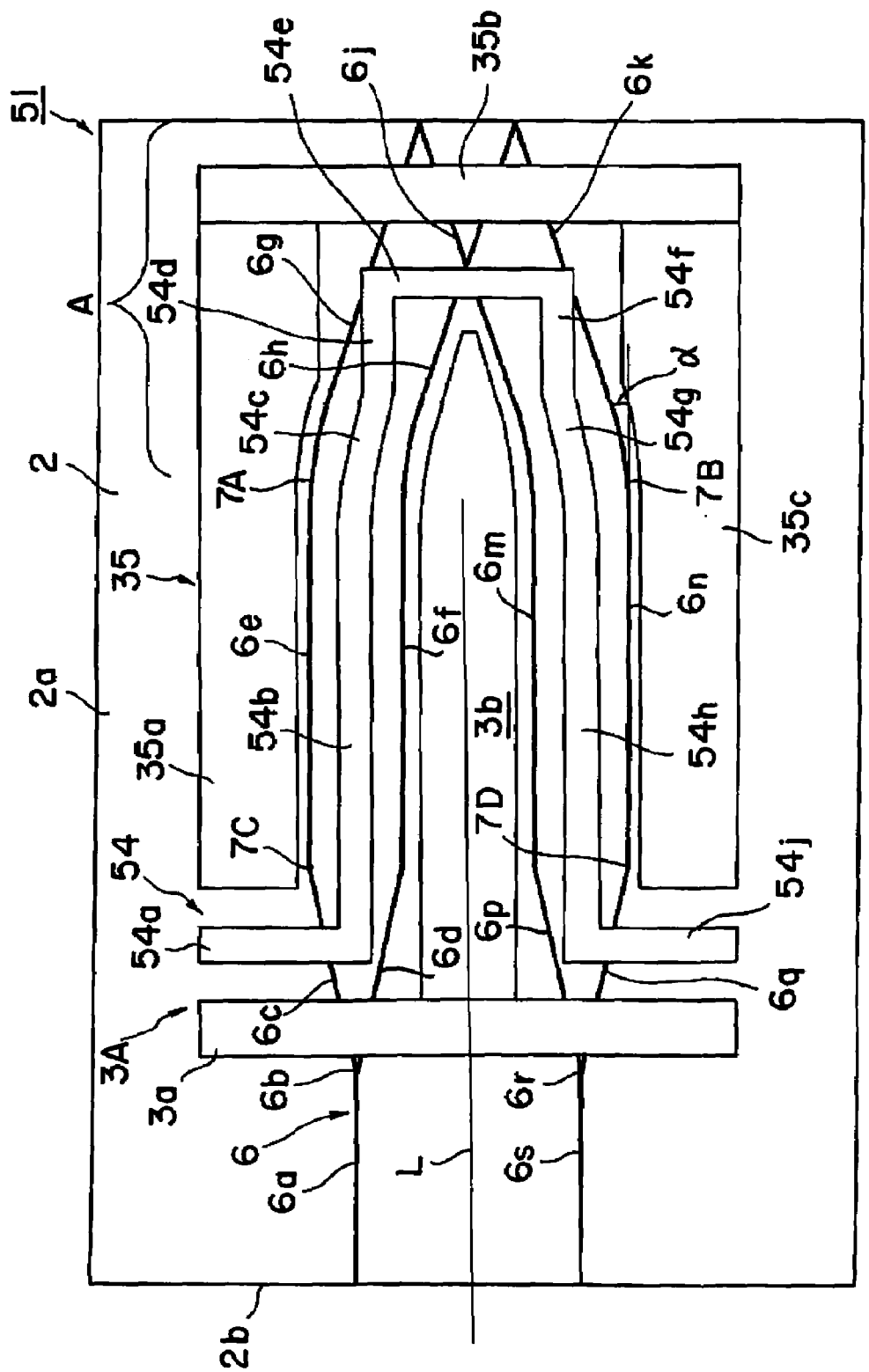
FIG. 10 is a plan view illustrating a device 51 according to the present invention.

The optical waveguide device 51 in FIG. 10 includes the substrate body 2. On one primary plane 2a of the substrate body 2 are formed the predetermined grounding electrodes 3A and 35 and a predetermined signal electrode 54.

The folding-back areas 6g and 6h are inclined by a predetermined angle α to the primary areas 6e and 6f, respectively. The inner grounding electrode 3A includes the feeding part 3a connected to the feed-through (not shown) and the electrode part 3b formed in a line, which extends substantially parallel to the primary parts. The outer grounding electrode 35 includes a connection part 35b stepping over the optical waveguides and a pair of electrode parts 35a and 35c.

The signal electrode 54 includes a pair of feeding parts 54a and 54j and electrode parts 54b and 54h extending parallel to the primary parts 6e and 6f through the feeding parts, respectively. The expanded parts 54c and 54g extend to incline slightly inward against the central axis L of the optical waveguide 6 from the electrode parts 54b and 54h, respectively. Further, the expanded parts 54c and 54g each connect to the expanded parts 54d and 54f that extend substantially parallel to the central axis L, respectively. The expanded parts 54d and 54f connect to an expanded part 54e extending substantially parallel to the connection part 35b of the grounding electrode 35. The expanded parts 54d and 54f are substantially parallel to the central axis L and extend to incline by an angle α toward the outer edges of the substrate with respect to the corresponding folding-back areas.

In the device 51 shown in FIG. 10, the signal electrode 54 is provided with the expanded parts 54c, 54d, 54f and 54g. Accordingly, it becomes possible to increase the signal electrode length and to remarkably reduce the difference between the optical path length inside the optical waveguide and the signal electrode length. Consequently, it has become possible to lower the drive voltage and at the same time to remarkably widen the modulation band.

Figure 11:
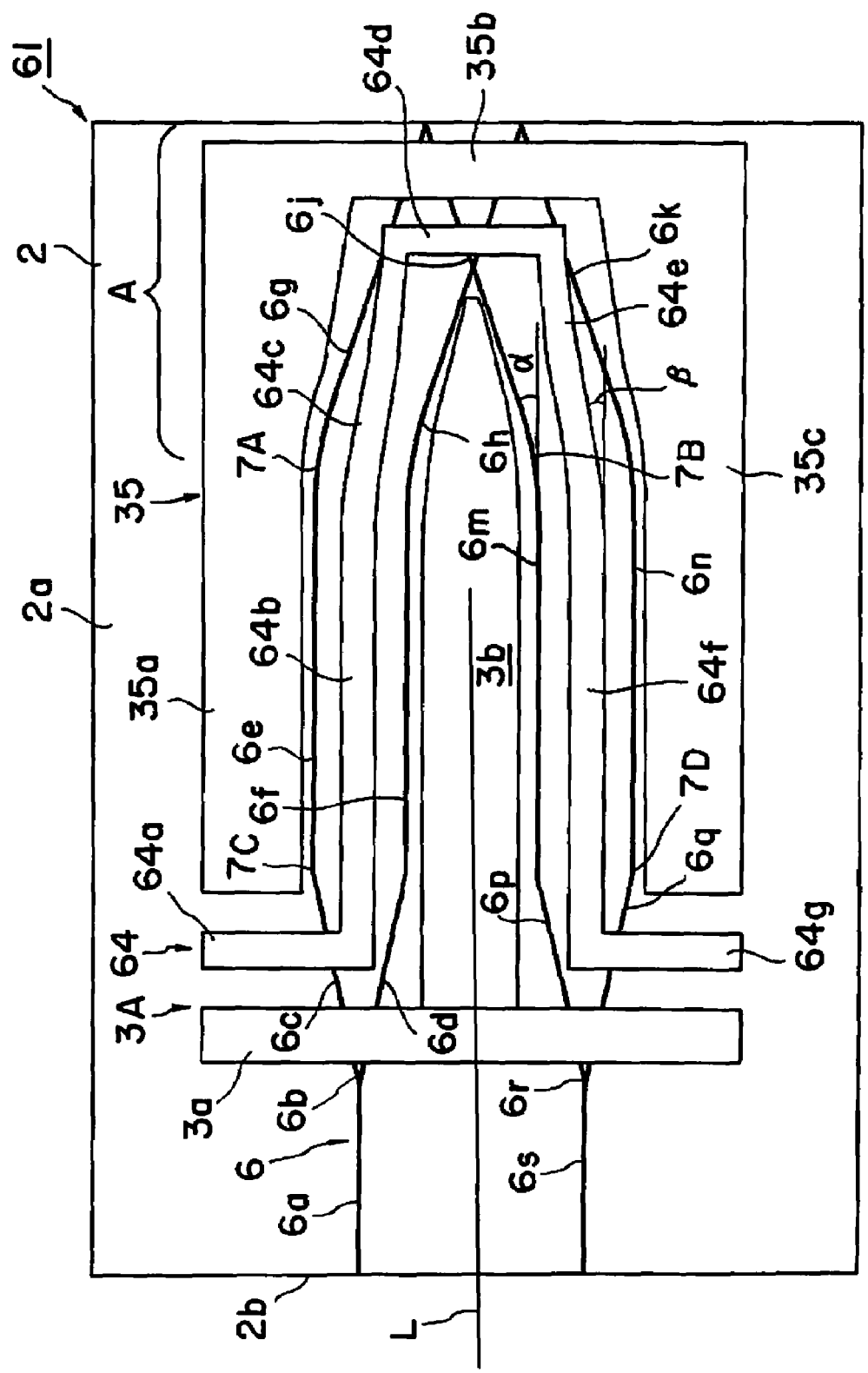
FIG. 11 is a plan view illustrating a device 61 according to the present invention.

The optical waveguide device 61 in FIG. 11 includes the substrate body 2. On one primary plane 2a of the substrate body 2 are formed the predetermined grounding electrodes 3A and 35 and a predetermined signal electrode 64.

The folding-back areas 6g and 6h are inclined by a predetermined angle α to the primary areas 6e and 6f, respectively. The inner grounding electrode 3A includes the feeding area 3a connected to the feed-through (not shown) and the electrode area 3b formed in a line, which extends substantially parallel to the primary areas. The outer grounding electrode 35 includes a connection area 35b stepping over the optical waveguides and a pair of electrode areas 35a and 35c.

The signal electrode 64 includes a pair of feeding parts 64a and 64g, and electrode parts 64b and 64f extending parallel to the primary areas 6e and 6f through the feeding parts, respectively. And the expanded parts 64c and 64e extend to incline slightly inward with respect to the central axis L of the optical waveguide 6 from the electrode parts 64b and 64f, respectively. The expanded parts 64c and 64e connect to an expanded part 64d substantially parallel to the connection part 35b of the grounding electrode. The expanded parts 64c and 64e incline inward against the central axis L, by an angle β, which is smaller than the angle α. Therefore, the expanded parts 64c and 64e extend to incline by an angle (α-β) toward the outer edges of the substrate with respect to the corresponding folding-back parts.

In the device 61 shown in FIG. 11, the signal electrode 64 is provided with the expanded parts 64c and 64e. Accordingly, it becomes possible to increase the signal electrode length and to remarkably reduce the difference between the optical path length inside the optical waveguide and the signal electrode length. Consequently, it has become possible to lower the drive voltage and at the same time to remarkably widen the modulation band.

The optical waveguide may be a ridge-type optical waveguide formed on one primary plane of a substrate directly or through another layer, or it may be an optical waveguide formed inside a substrate by means of the diffusion method or the ion exchange method, for example, a titanium diffusion optical waveguide or a proton exchanged optical waveguide. In concrete, it may be a ridge-type optical waveguide projecting from the surface of a substrate. The ridge-type optical waveguide can be formed by the laser beam processing or the machining. Alternatively by forming a film with a high refractive index on a substrate and processing this film by the laser ablation or the machining, a ridge-type three-dimensional optical waveguide can be formed. The film with a high refractive index can be formed by means of, for example, chemical vapor phase deposition, physical vapor phase deposition, metal organic chemical vapor phase deposition, sputtering, and liquid phase epitaxy.

In each of the above embodiments, the electrodes are provided on the surface of the substrate. However, the electrodes may be formed directly on the surface of the substrate, or it may be formed on a layer of low dielectric constant or on a buffer layer. The layer of low dielectric constant can be made with well-known materials, such as silicon oxide, magnesium fluoride, silicon nitride or aluminum oxide. Here, the layer of low dielectric constant refers to the layer made of a material having a dielectric constant lower than that of a material making up the substrate body.

The substrate body 2 and the supporting substrate 23 are made with a ferroelectric electro-optic material, preferably with a monocrystal thereof. As such a crystal can be listed lithium niobate, lithium tantalite, lithium niobate-lithium tantalite solid solution, potassium lithium niobate, KTP, GaAs and quartz and so forth, which are not particularly confined as long as being capable of modulating a beam of light.

The material of the supporting substrate 23 may be, in addition to the above ferroelectric electro-optic materials, a glass such as a quartz glass.

The adhesive is made of a material of a lower dielectric constant than the substrate body 2. Concretely, the following can be cited: epoxy resin adhesive, heat curing adhesive, ultraviolet curing adhesive, Aron ceramics (trade name from Toa Synthesis Inc.) having a coefficient of thermal expansion ($13 \times 10^{-6}$/K), which is comparably close to that of a material having an electro-optic effect such as a lithium niobate, although being not particularly confined as long as the above condition is satisfied.

In each of the above embodiments, the invention is applied to an amplitude modulator; however, it is clear that the invention is applicable to a phase modulator having a different configuration of the optical waveguide.

EXAMPLES

Comparison Example 1

The optical waveguide device 21 as shown in FIG. 2 and FIG. 3 was manufactured and it was adhered onto the supporting substrate.

Concretely by using an X-cut 3-inch wafer (LiNbO$_3$ single crystal) and by means of the titanium diffusion process and the photolithography method, a Mach-Zehnder optical waveguide 6 was formed on the surface of the wafer. The size of the optical waveguide was planed 10 μm at $1/e^2$, for example. Then, the signal electrode 14 and the grounding electrodes 13 and 15 were formed by plating.

Then, a polishing dummy substrate was fixed on a polishing plate, and the substrate body for a modulator was affixed thereon with the electrode side facing downward. Next, the substrate body 2 for a modulator was thinned to the thickness of 7.5 μm by the horizontal polishing, lapping and polishing (CMP). Next, the substrate body 2 was fixed on the supporting substrate in a flat plate. The resin thickness for adhering and fixing was set at 50 μm. The end face of the optical waveguide (connection area to an optical fiber) was polished, and the wafer was cut by a dicing cutter to acquire chips. The width of the chips was made to be 2 mm, and the total thickness of the device was made to be 0.5 mm.

A polarization-maintaining optical fiber for 1.55 μm and a single-core fiber array retaining a 1.3 μm single-mode fiber were manufactured; the former was coupled to the input side and the latter was coupled to the output side of the optical modulator chip. The core aligning of the optical fiber and the optical waveguide was made and both were adhered by an ultraviolet curing resin adhesive.

Figure 5:
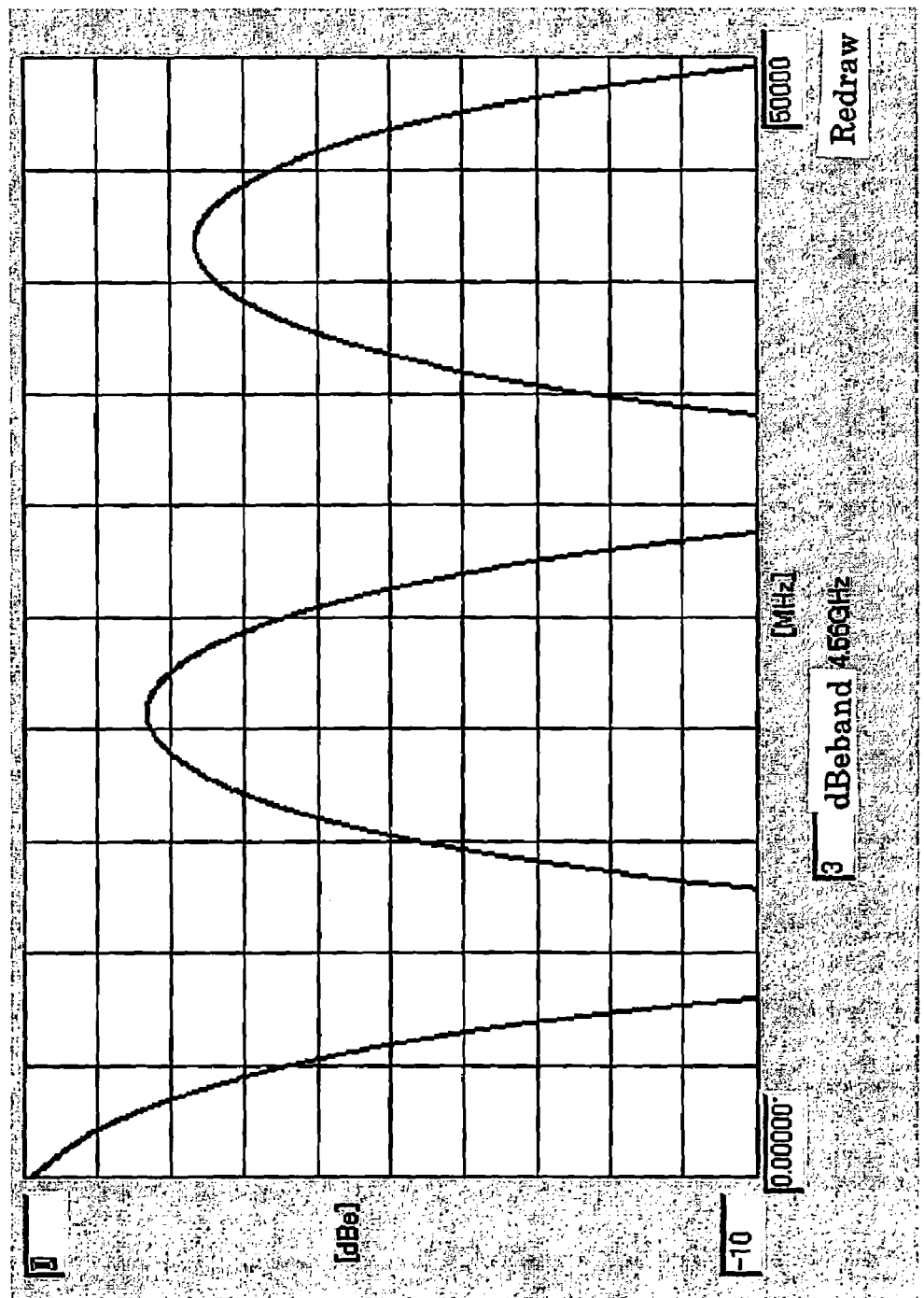
FIG. 5 is a graph illustrating a modulation band when a microwave effective refractive index is 2.2 in a comparison example.

The gap between the signal electrode and the grounding electrode was 21.5 μm. The thickness of the electrodes was 20 μm. The curvature radius of each curved area was 15 mm, the whole angle θ of the folding-back areas was 10°, the offset e was 500 μm, and the optical path length of the folding-back areas was 7.0 mm in total of coming and going. The signal electrode length in the folding-back areas was 500 μm, which brought a difference of 6.5 mm between the electrode length and the optical path length. The interacting electrode length was 15 mm for both of the first step and the second step. A detailed calculation of the band was made to such a traveling-wave optical modulator. The result was found that the modulation band was restricted to 4.5 GHz, when the microwave effective refractive index was set to 2.2 so as to match the speed in the interaction area. This result is shown in FIG. 5.

Figure 6:
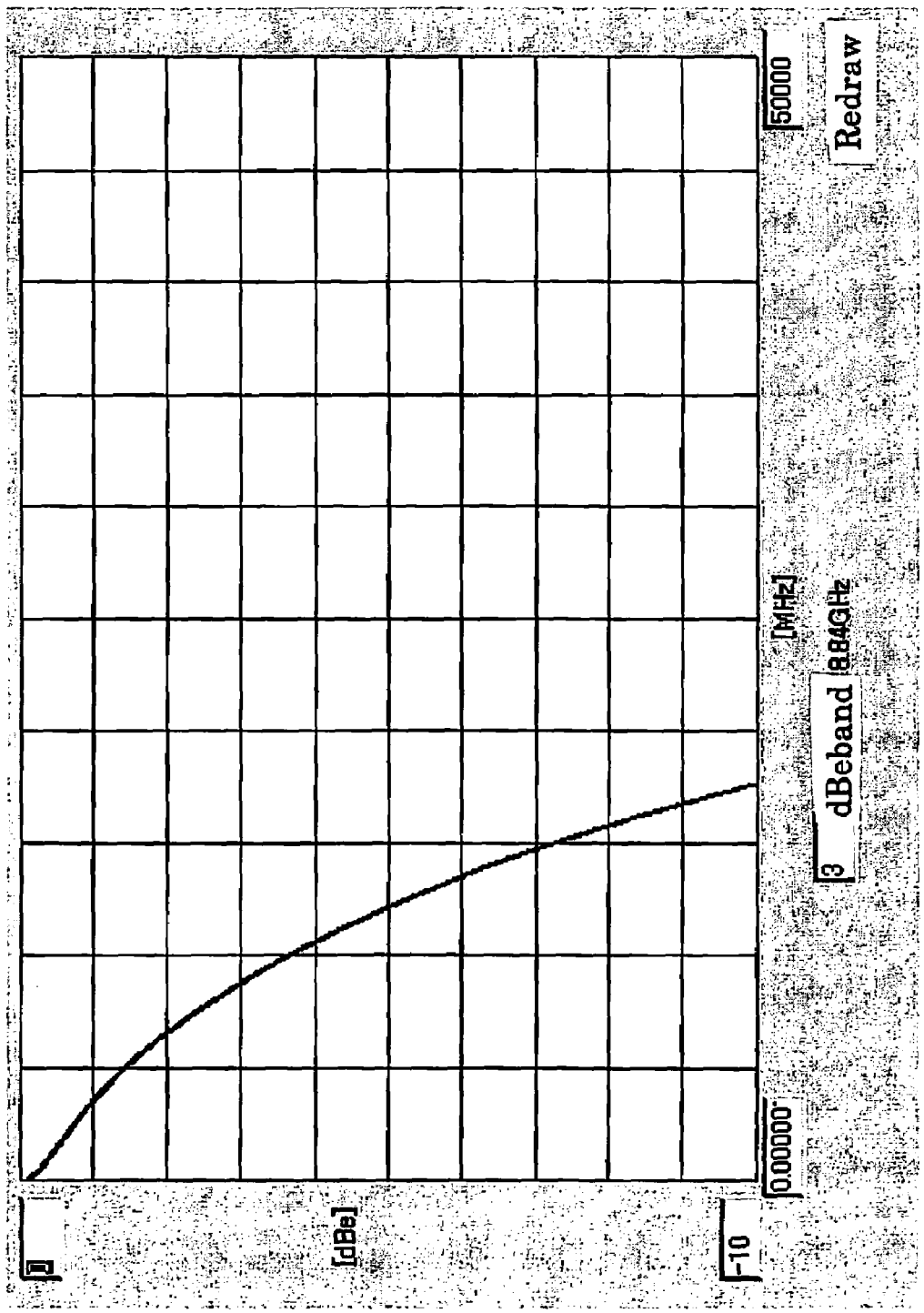
FIG. 6 is a graph illustrating a modulation band when a microwave effective refractive index is 2.8 in a comparison example.

In the optical modulator of this comparison example, the electrode length is relatively short, in order to align the total arrival time difference between the light wave and the electric signal wave; therefore, by setting the microwave effective refractive index higher than 2.2, the arrival time difference between the light wave and the electric signal wave can be reduced, thereby enhancing the modulation band. However, it was confirmed by calculation that raising the microwave effective refractive index to 2.9, for example, provides the band of 8.8 GHz at best (FIG. 6).

Example 1

The optical waveguide device 1A as shown in FIG. 1 and FIG. 2 was manufactured and it was adhered on the supporting substrate.

Concretely, by using the X-cut 3-inch wafer (LiNbO$_3$ single crystal) and by means of the titanium diffusion process and the photolithography method, the Mach-Zehnder optical waveguide 6 was formed on the surface of the wafer. The size of the optical waveguide was planed 10 μm at $1/e^2$, for example. Then, the signal electrode 4 and the grounding electrodes 3 and 5 were formed by plating process.

Then, the polishing dummy substrate was fixed on the polishing plate, and the substrate body for the modulator was affixed thereon with the electrode side facing downward. Next, the substrate body 2 for the modulator was thinned to the thickness of 7.5 μm by the horizontal polishing, lapping and polishing (CMP). Next, the substrate body 2 was fixed on the supporting substrate in a flat plate. The resin thickness for adhering and fixing was set at 50 μm. The end face of the optical waveguide (connection area to an optical fiber) was polished, and the wafer was cut by a dicing cutter to acquire chips. The width of the chips was made to be 2 mm, and the total thickness of the device was made to be 0.5 mm.

The polarization-maintaining optical fiber for 1.55 μm and the single-core fiber array retaining a 1.3 μm single-mode fiber were manufactured; the former was coupled to the input side and the latter was coupled to the output side of the optical modulator chip and, the core aligning of the optical fiber and the optical waveguide was made and both were adhered by an ultraviolet curing resin adhesive.

Figure 7:
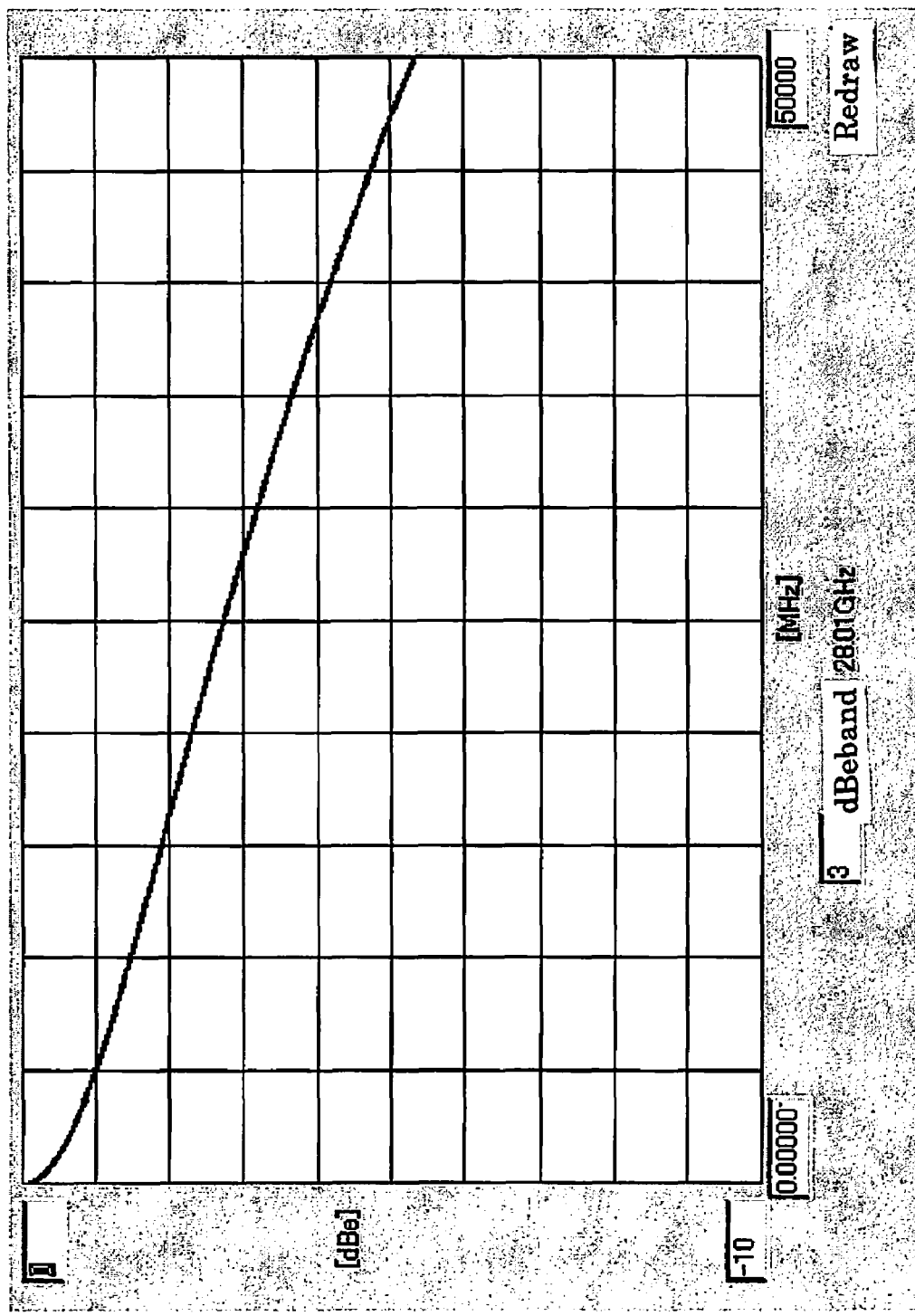
FIG. 7 is a graph illustrating a modulation band when a microwave effective refractive index is 2.3 in an embodiment of the present invention.

The gap between the signal electrode and the grounding electrode was 21.5 μm. The thickness of the electrodes was 20 μm. The curvature radius of each curved area was 15 mm, the whole angle θ of the folding-back areas was 10°, the offset e was 500 μm, and the optical path length of the folding-back areas was 7.0 mm in total of coming and going. The signal electrode length in the folding-back areas was 5.8 mm in total of the first step and the second step. The interacting electrode length was 17.9 mm for both the first step and the second step. The difference between the electrode length and the optical path length was decreased to 1.2 mm. A detailed calculation of the band was made to such a traveling-wave optical modulator. The result was found that the modulation band was enhanced to 28 GHz, when the microwave effective refractive index was set to 2.3 so as to match the speed in the interaction area (FIG. 7).

Example 2

The optical waveguide device 31 as shown in FIG. 8 and FIG. 2 was manufactured and it was adhered on the supporting substrate.

Concretely by using the X-cut 3-inch wafer (LiNbO$_3$ monocrystal) and by means of the titanium diffusion process and the photolithography method, the Mach-Zehnder optical waveguide 6 was formed on the surface of the wafer. The size of the optical waveguide was planed 10 μm at 1/e$^2$, for example. Then, the signal electrode 34 and the grounding electrodes 3A and 35 were formed by plating process.

Then, the polishing dummy substrate was fixed on the polishing plate, and the substrate body for the modulator was affixed thereon with the electrode side facing downward. Next, the substrate body 2 for the modulator was thinned to the thickness of 7.5 μm by the horizontal polishing, lapping and polishing (CMP). Next, the substrate body 2 was fixed on the supporting substrate in a flat plate. The resin thickness for adhering and fixing was set to 50 μm. The end face of the optical waveguide (connection area to an optical fiber) was polished, and the wafer was cut by a dicing cutter to acquire chips. The width of the chips was made to be 2 mm, and the total thickness of the device was made to be 0.5 mm.

The polarization-maintaining optical fiber for 1.55 μm and the single-core fiber array retaining a 1.3 μm single-mode fiber were manufactured; the former was coupled to the input side and the latter was coupled to the output side of the optical modulator chip and, the core aligning of the optical fiber and the optical waveguide was made and both were adhered by a ultraviolet curing resin adhesive.

The gap between the signal electrode and the grounding electrode was 21.5 μm. The thickness of the electrodes was 20 μm. The curvature radius of each curved area was 15 mm, the whole angle θ of the folding-back areas was 10°, the offset e was 500 μm, and the optical path length of the folding-back areas was 7.0 mm in total of coming and going. The signal electrode length in the folding-back areas was 7.0 mm. The interacting electrode length was 16 mm for both of the first step and the second step. The maximum distance from the center axis of the expanded areas 34d, 34g, 34e and 34f was 0.23 mm. Accordingly, the difference between the electrode length and the optical path length was substantially zero.

When using an X-cut lithium niobate monocrystal substrate, the crystal axis and the transmission axis of the electric signal become parallel in the expanded areas 34e-34f. Accordingly, the microwave refractive index becomes high, in comparison to the areas of the Y-transmission and substantially Y-transmission. In this case, by designing the total sum of the products of the microwave refractive index and the physical electrode length to be equal to the product of the waveguide refractive index and the total optical waveguide length, the complete speed matching and the widening of the modulation band can be achieved.

Figure 12:
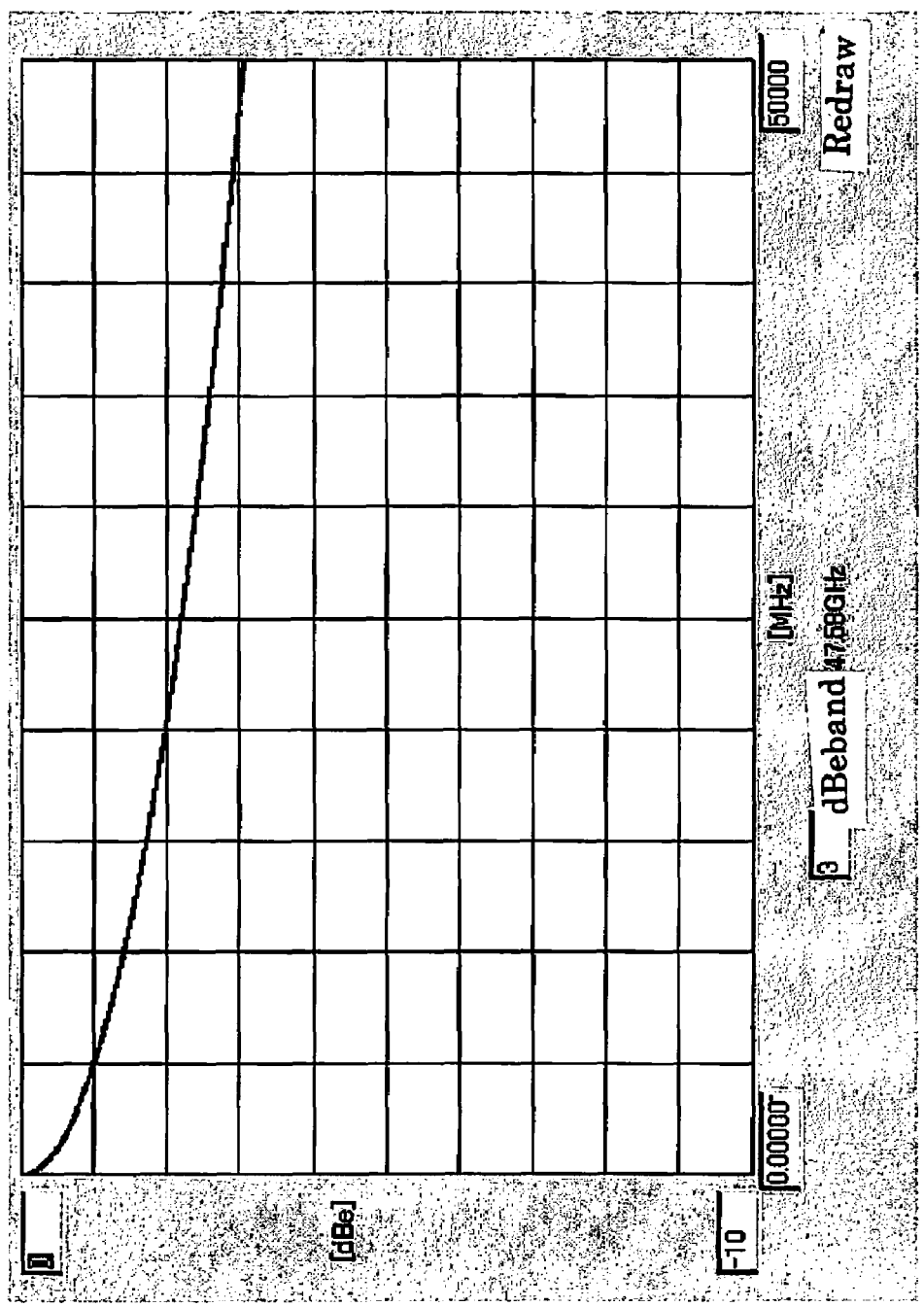
FIG. 12 is a graph illustrating a modulation band when a microwave effective refractive index is 2.2 in the device in FIG. 8.

A detailed calculation of the band was made to such a traveling-wave optical modulator. The result was found that the modulation band was enhanced to about 47 GHz, when the microwave effective refractive index was set to 2.2 so as to match the speed in the interaction area (FIG. 12).

Although specific embodiments have been described above, the present invention is not restricted to these specific embodiments, and can be implemented with various changes and modifications without departing from the scope of the claims.

The invention claimed is:

1. An optical waveguide device comprising:
a substrate body comprising an electro-optical material;
an optical waveguide; and
a signal electrode and a grounding electrode for applying a voltage on said optical waveguide,
wherein said optical waveguide comprises a first primary area, a first curved area, a folding-back point, a first folding-back area provided between said first curved area and said folding-back point, a second primary area, a second curved area and a second folding-back area provided between said second curved area and said folding-back point, and
wherein at least a part of said signal electrode is provided in a folding-back region extending from said first curved area and said second curved area to said folding-back point wherein at least a part of said first folding-back area is parallel with said signal electrode in said folding-back region and at least a part of said second folding-back area is parallel with said signal electrode in said folding-back region.

2. The optical waveguide device of claim 1, wherein said voltage is applied on said optical waveguide though said signal electrode and said grounding electrode in said first primary area, said first folding-back area, said second folding-back area and said second primary area.

3. The optical waveguide device of claim 1, wherein said optical waveguide is provided between said grounding electrode and said signal electrode.

4. The optical waveguide device of claim 1, wherein said optical waveguide further comprises an incident area connected to said first primary area and an outgoing area connected to said second primary area, and wherein said voltage is applied on said optical waveguide in said incident area and said outgoing area.

5. The optical waveguide device of claim 1, wherein said signal electrode comprises a first primary part, a second primary part, a first expanded part extending from said first primary part, a second expanded part extending from said second primary part and a connection part provided between said first expanded part and said second expanded part, and wherein said voltage is applied on said optical waveguide in at least said first primary and said second primary parts.

6. The optical waveguide device of claim 5, wherein said first expanded part is inclined to said first folding-back area of said optical waveguide toward an outer edge of said substrate body.

7. The optical waveguide device of claim 6, wherein said second expanded area is inclined to said second folding-back area of said optical waveguide toward an outer edge of said substrate body.

8. The optical waveguide device of claim 1, wherein said optical waveguide comprises a Mach-Zehnder optical waveguide.

9. The optical waveguide device of claim 1, comprising a traveling-wave type optical modulator.

* * * * *